(12) United States Patent
Chen

(10) Patent No.: US 12,736,284 B2
(45) Date of Patent: Sep. 15, 2026

(54) PLASTIC DEHUMIDIFICATION AND DRYING DEVICE

(71) Applicant: RUN HUI TECHNOLOGY CORPORATION, Taichung City (TW)

(72) Inventor: Ting-An Chen, Taichung City (TW)

( * ) Notice: Subject to any disclaimer, the term of this patent is extended or adjusted under 35 U.S.C. 154(b) by 495 days.

(21) Appl. No.: 18/457,345

(22) Filed: Aug. 29, 2023

(65) Prior Publication Data

US 2025/0075975 A1 Mar. 6, 2025

(51) Int. Cl.

| | |
|---|---|
| ***F26B 21/33*** | (2026.01) |
| ***B29B 13/06*** | (2006.01) |
| ***F26B 3/16*** | (2006.01) |
| ***F26B 17/14*** | (2006.01) |
| ***F26B 21/25*** | (2026.01) |

(Continued)

(52) U.S. Cl.

CPC .......... *F26B 21/333* (2026.01); *B29B 13/065* (2013.01); *F26B 3/16* (2013.01); *F26B 17/1425* (2013.01); *F26B 21/25* (2026.01); *F26B 21/331* (2026.01); *F26B 23/10* (2013.01); *F26B 25/007* (2013.01)

(58) Field of Classification Search

CPC ............... B29B 13/065; F26B 17/1425; F26B 21/333; F26B 21/331; F26B 21/25; F26B 3/16; F26B 23/10; F26B 25/007

See application file for complete search history.

(56) References Cited

U.S. PATENT DOCUMENTS 5,513,445 A * 5/1996 Farrag ............... B29C 49/42817 34/582
12,422,189 B2 * 9/2025 Sun ...................... A23N 17/004

(Continued)

FOREIGN PATENT DOCUMENTS

| | | | | |
|---|---|---|---|---|
| CN | 109760231 A | * | 5/2019 | |
| CN | 208946442 U | * | 6/2019 | |
| JP | 2007160581 A | * | 6/2007 | ............. B29B 13/06 |

OTHER PUBLICATIONS

Machine translation of CN-109760231-A to Feng. (Year: 2019).*
Machine translation of CN-208946442-U to Du. (Year: 2019).*
Machine translation of JP 2007-160581-A to Kawase. (Year: 2007).*

*Primary Examiner* — Joseph L. Perrin
(74) *Attorney, Agent, or Firm* — Che-Yang Chen; Law Office of Michael Chen

(57) ABSTRACT

A plastic dehumidification and drying device includes a dehumidification host system, an air supply system and at least one plastic processing system. The air in the dehumidification host system is cooled by the host windmill through a secondary condenser and enters a host honeycomb runner. The host honeycomb runner uses a host regeneration windmill and a host regeneration heater to send regeneration air to help absorb moisture. The host honeycomb runner sends the dehumidified air to the plastic processing system for drying plastics. The air returns to the dehumidification host system and passes through the host filter, then the closed cycle is carried out through the primary condenser and the host windmill. The primary condenser and the secondary condenser are provided with ice water to cool the moisture in the contracted air. The air supply system supplies air to the dehumidification host system to supplement the pressure loss, further reduce the dew point and increase the efficiency of dehumidification.

4 Claims, 3 Drawing Sheets

(51) Int. Cl.
*F26B 23/10* (2006.01)
*F26B 25/00* (2006.01)

(56) References Cited

U.S. PATENT DOCUMENTS

| | | | | |
|---|---|---|---|---|
| 2009/0134537 | A1* | 5/2009 | Eloo | B29B 7/58<br>264/14 |
| 2010/0132211 | A1* | 6/2010 | Pittari | B29B 13/065<br>34/265 |
| 2010/0205821 | A1* | 8/2010 | Tada | B01D 53/261<br>34/570 |
| 2014/0202019 | A1* | 7/2014 | Eloo | F26B 17/105<br>34/382 |
| 2021/0018262 | A1* | 1/2021 | Tanaka | F26B 3/16 |

* cited by examiner

PLASTIC DEHUMIDIFICATION AND DRYING DEVICE

BACKGROUND OF THE INVENTION

Field of the Invention

The invention relates to a plastic dehumidification and drying device, in particular to a plastic dehumidification and drying device capable of improving the dehumidification efficiency of plastics.

Description of the Related Art

The quality of plastic products depends on the quality of the plastic, and the humidity of the plastic is one of the indicators that affect the quality. When the humidity of the plastic is too high, it will have a bad effect on the plastic product. Before the plastic is processed, a heater is often used to raise the temperature to escape the water vapor in the plastic, and this process will consume a lot of energy and result in increased production costs and poor efficiency. The quality of plastic products cannot be further controlled, and the energy consumption is also inconsistent with the idea of energy saving and carbon reduction.

Therefore, it is imperative to improve the plastic dehumidification and drying device. The conventional plastic dehumidification and drying device generates temperature difference through the condenser to generate dew, thereby performing the function of dehumidification. In the process of dehumidification of the plastic raw material, the lower the dew point of the dehumidification equipment, the lower the final moisture content of plastic raw materials. However, the dew point temperature of conventional plastic dehumidification and drying equipment can only reach −50° C. to −55° C., which is the limit, and still does not have good dehumidification efficiency. The lack of good dehumidification efficiency also means that it takes more time and the production efficiency is greatly reduced. Furthermore, the conventional plastic dehumidification and drying device also has the problem of pressure loss due to pipeline resistance during use, which affects the gas flow.

For example, the drying temperature of conventional technology applied to TPU plastics is 90-110° C., and the drying time is about 3 hours. At this stage, a new type of low-temperature 35-50° C. TPU plastic has been developed. The boiling point of water is known as 100° C., and the lower the temperature of the drying material, the longer the drying time will be, so the drying time will be extended to 16 hours or even more than 20 hours. If the output of a production line is expected to be 1,000 kg per hour, the plastic drying bucket having a capacity of 16,000-20,000 kg will be prepared in advance and equipped with a dehumidification dryer with the same air volume. Currently, it is known that the largest dehumidification dryer that can be produced is 7,000 $m^3$/hr. Taking a 20,000 kg drying bucket as an example, three sets of 7,000 kg material tank must be installed with a 7,000 $m^3$/hr dehumidification dryer. This will result in an excessively large footprint, which is undoubtedly a disadvantage under the premise that the plant area is the production cost.

Moreover, if plastic dehumidification and drying devices are used in the factory building, when the dehumidification efficiency is not good, multiple plastic dehumidification and drying devices must be installed next to each of the plastic barrels. This will result in decentralized production lines, difficult management, high costs, and poor quality control. Hence, a plastic dehumidification drying device with good dehumidification efficiency is very important.

SUMMARY OF THE INVENTION

The technical problem to be solved by the present disclosure is to provide a plastic dehumidification and drying device capable of improving the dehumidification efficiency of plastics in view of the above-mentioned deficiencies in the prior art.

To achieve the aforementioned purpose, the present disclosure provides a plastic dehumidification and drying device. The plastic dehumidification and drying device includes a dehumidification host system, an air supply system, and at least one plastic processing system. The dehumidification host system includes a host honeycomb runner, a primary condenser, a secondary condenser, a host windmill, a host regeneration windmill, a host regeneration heater, and a host filter. The air supply system includes an air supply honeycomb runner, an air supply condenser, an air supply medium pressure windmill, an air supply regeneration windmill, an air supply regeneration heater, and an air supply filter. The plastic processing system includes a drying windmill, a heater, a plastic drying barrel, a cyclone dust collector, and a plastic fetching device. The air is cooled by the host windmill through the secondary condenser and enters the host honeycomb runner. A high-temperature regeneration air heated by the host regeneration windmill and the host regeneration heater is sent to the host honeycomb runner to help moisture suction. The high-temperature regeneration air leaves the dehumidification host system through a host regeneration air exit. The host honeycomb runner sends a dehumidified low-temperature dry air to the drying windmill and the dehumidified low-temperature dry air is heated by the heater and sent into the plastic drying barrel. Plastics used as raw materials for manufacturing are placed in the plastic drying barrel, and the cyclone dust collector is connected to the plastic drying barrel to suck out and filter the air that becomes high temperature and humid after being used to dry plastics and returns to the dehumidification host system and passes through the host filter for filtration. The air is then cooled down by the primary condenser and passes through the host windmill to perform a closed cycle. The plastic fetching device is connected to the plastic drying barrel and the dry plastic is fed into the plastic fetching device for using in the manufacturing process. Since the host windmill of the dehumidification host system in the closed cycle causes pressure loss and system imbalance, it is necessary to use the air supply system to supplement the dehumidification host system to compensate the imbalance caused by pressure loss, therefore, during operation, the air supply system absorbs the atmosphere and passes through the air supply filter to filter, and then cools down through the air supply condenser and discharges dew. The cooled air passes through the air supply medium pressure windmill to enter the air supply honeycomb runner to absorb moisture. The air supply honeycomb runner uses the heated high-temperature regeneration air sent by the air supply regeneration windmill and the air supply regeneration heater to help absorb moisture. The regeneration air leaves the air supply system through an air supply regeneration air exit. When the air in the closed cycle reaches the host filter, the host windmill synchronously inhales the low-temperature dry air discharged from the air supply medium-pressure windmill through the air supply honeycomb runner. The primary condenser also synchronously inhaled the cooled dry air of the host honeycomb runner and the air supply honeycomb runner, so as to supplement the pressure loss of the dehumidification host system. The primary condenser, the secondary condenser, and the air supply condenser are cooled by supplying ice water, and the primary condenser, secondary condenser, and the air supply condenser are each equipped with a drain valve to discharge condensed dew. With the above structure, the primary condenser and the secondary condenser are supplied with ice water for cooling, instantly expand the temperature difference to accelerate the dew condensation effect, and then shrink the moisture of the humid air to achieve the effect of dehumidification and drying. The dehumidification host system is compensated the pressure loss through the air supply system to further improve the dew condensation effect, so that the dehumidification host system has a lower dew point temperature and shrinks the moisture of the humid air to achieve better dehumidification efficiency.

Preferably, a connection between the primary condenser, the secondary condenser, the air supply condenser, and the drain valve is an S-shaped structure.

Preferably, the primary condenser and the secondary condenser are injected with ice water at about 12° C. as refrigerant water for cooling.

The main purpose of the present disclosure is that the primary condenser and the secondary condenser are injected with ice water for cooling, instantly expand the temperature difference to accelerate the dew condensation effect, and then shrink the moisture of the humid air, and achieve the effect of dehumidification and drying. The air supply system performs depressurization and air replenishment on the dehumidification host system, which can further improve the dew condensation effect, so that the dehumidification host system has a lower dew point temperature and shrinks the moisture of the humid air to achieve better dehumidification efficiency. There is a low-temperature drying air outlet at the opening between the host honeycomb runner and the drying windmill. Through the air supply system, the dehumidification host system is depressurized and supplied with air, and the dew point temperature is adjusted at the low-temperature drying air outlet. According to actual measurements, the dew point temperature at the outlet of the low-temperature drying air can be further lowered to −65° C., which has excellent dehumidification effect, and the dehumidification host system starts to operate until the dew point temperature reaches −65° C. in less than 1 hour, and there is excellent dehumidification efficiency.

With this invention, the plastic dehumidification and drying device of the present disclosure utilizes the characteristics of the small cross-sectional area of the filter hole and the ability to compress the airflow to reliably separate the dust and drag it to the dust collection bucket to achieve the effect of separating and collecting dust.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
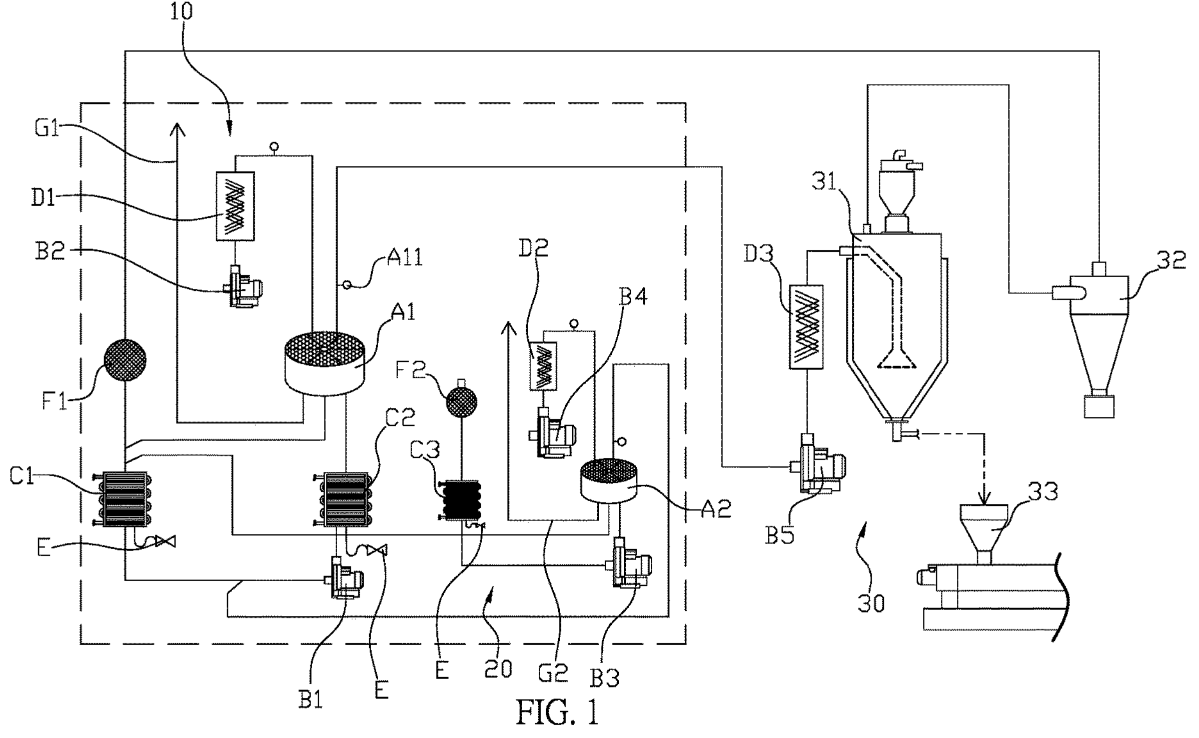
FIG. 1 illustrates a schematic diagram of the structure of the present invention.
Figure 2:
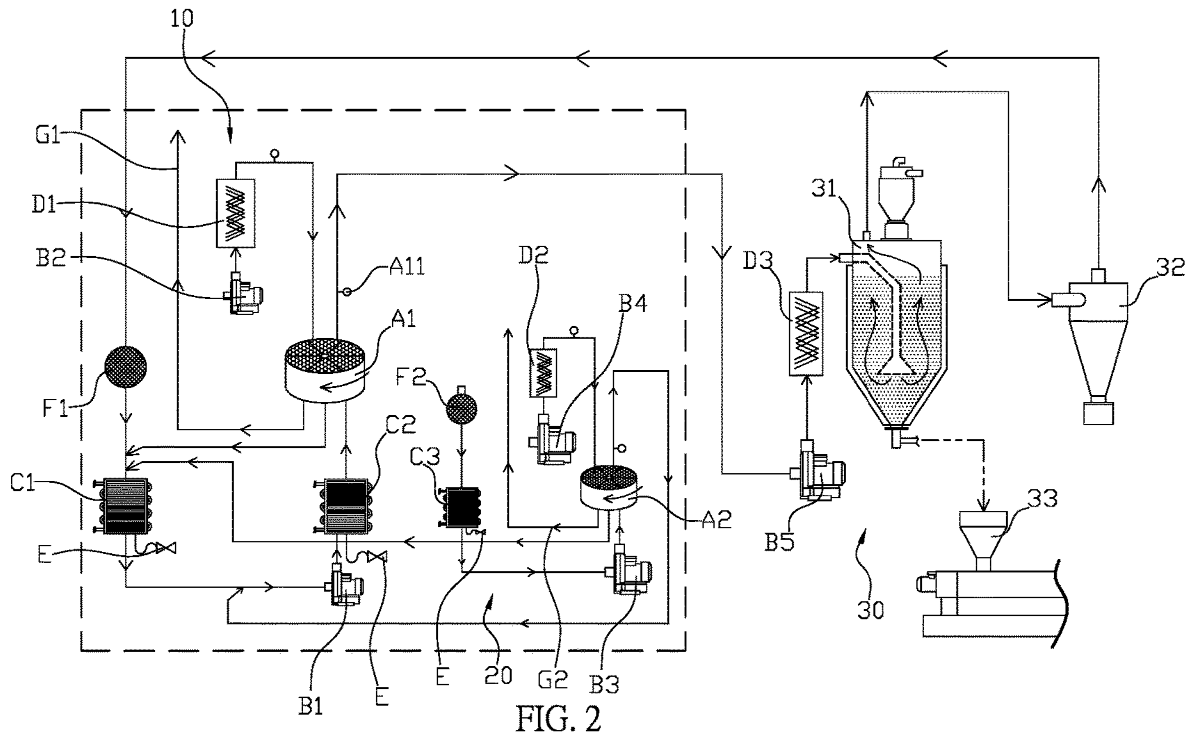
FIG. 2 illustrates a schematic diagram of the air flow direction of the present invention.

As shown in FIG. 1 and FIG. 2, the present disclosure provides a plastic dehumidification and drying device, which includes a dehumidification host system (10), an air supply system (20) and at least one plastic processing system (30). The dehumidification host system (10) includes a host honeycomb runner (A1), a primary condenser (C1), a secondary condenser (C2), a host windmill (B1), a host regeneration windmill (B2), a host regeneration heater (D1), and a host filter (F1). The air supply system (20) includes an air supply honeycomb runner (A2), an air supply condenser (C3), an air supply medium pressure windmill (B3), an air supply regeneration windmill (B4), an air supply regeneration heater (D2), and an air supply filter (F2). The plastic processing system (30) includes a drying windmill (B5), a heater (D3), a plastic drying barrel (31), a cyclone dust collector (32), and a plastic fetching device (33). The air is cooled by the host windmill (B1) through the secondary condenser (C2) and enters the host honeycomb runner (A1). The high-temperature regeneration air heated by the host regeneration windmill (B2) and the host regeneration heater (D1) is sent to the host honeycomb runner (A1) to help moisture suction. The high-temperature regeneration air leaves the dehumidification host system (10) through a host regeneration air exit (G1). The host honeycomb runner (A1) sends a dehumidified low-temperature dry air to the drying windmill (B5) and the dehumidified low-temperature dry air is heated by the heater (D3) and sent into the plastic drying barrel (31). The plastics used as raw materials for manufacturing are placed in the plastic drying barrel (31), and the cyclone dust collector (32) is connected to the plastic drying barrel (31) to suck out and filter the air that becomes high temperature and humid after being used to dry plastics, and returns to the dehumidification host system (10) and passes through the host filter (F1) for filtration. The air is then cooled down by the primary condenser (C1) and passes through the host windmill (B1) to perform a closed cycle. The plastic fetching device (33) is connected to the plastic drying barrel (31) and the dry plastic is fed into the plastic fetching device (33) for using in the manufacturing process. Since the host windmill (B1) of the dehumidification host system (10) in the closed cycle causes pressure loss and system imbalance, it is necessary to use the air supply system (20) to supplement the dehumidification host system (10) to compensate the imbalance caused by pressure loss, therefore, during operation, the air supply system (20) absorbs the atmosphere and passes through the air supply filter (F2) to filter, and then cools down through the air supply condenser (C3) and discharges dew. The cooled air passes through the air supply medium pressure windmill (B3) to enter the air supply honeycomb runner (A2) to absorb moisture. The air supply honeycomb runner (A2) uses the heated high-temperature regeneration air sent by the air supply regeneration windmill (B4) and the air supply regeneration heater (D2) to help absorb moisture. The regeneration air leaves the air supply system (20) through an air supply regeneration air exit (G2). When the air in the closed cycle reaches the host filter (F1), the host windmill (B1) synchronously inhales the low-temperature dry air discharged from the air supply medium-pressure windmill (B3) through the air supply honeycomb runner (A2). The primary condenser (C1) is also synchronously inhaled the cooled dry air of the host honeycomb runner (A1) and the air supply honeycomb runner (A2), so as to supplement the pressure loss of the dehumidification host system (10). The primary condenser (C1), the secondary condenser (C2), and the air supply condenser (C3) are cooled by supplying ice water, and the primary condenser (C1), the secondary condenser (C2), and the air supply condenser (C3) are each equipped with a drain valve (E) to discharge condensed dew.

With the above structure, the primary condenser (C1) and the secondary condenser (C2) are supplied with ice water for cooling, instantly expand the temperature difference to accelerate the dew condensation effect, and then shrink the moisture of the humid air to achieve the effect of dehumidification and drying. The dehumidification host system (10) is compensated the pressure loss through the air supply system (20) to further improve the dew condensation effect, so that the dehumidification host system (10) has a lower dew point temperature and shrinks the moisture of the humid air to achieve better dehumidification efficiency.

Figure 3:
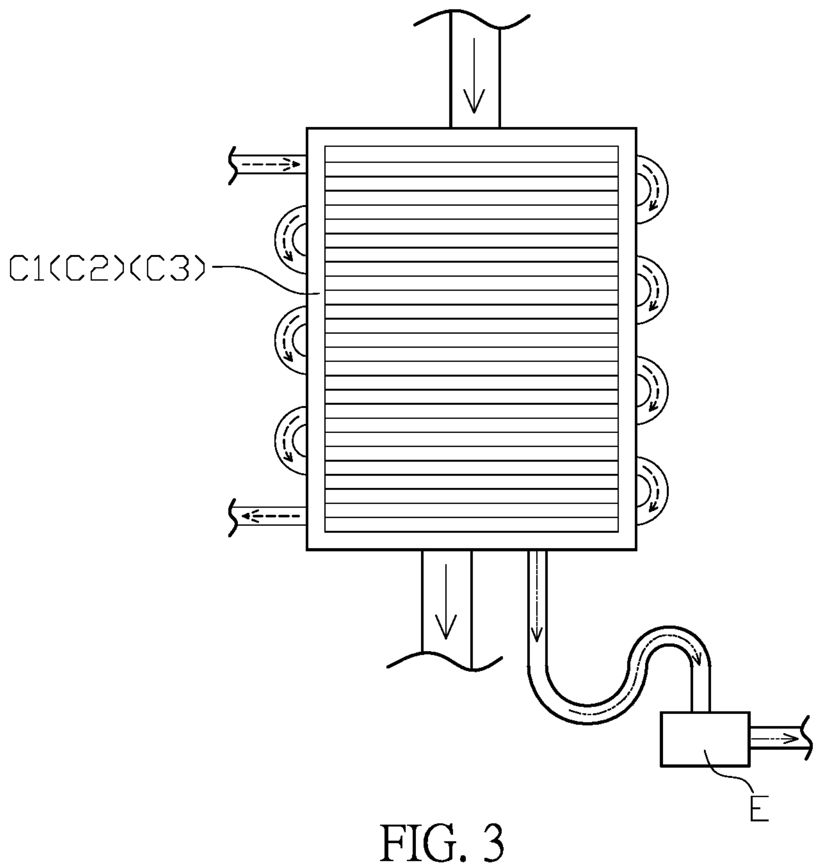
FIG. 3 illustrates a schematic diagram of cooling by the condenser of the present invention.

As shown in FIG. 3, the present disclosure provides a plastic dehumidification and drying device, wherein, the connection between the primary condenser (C1), the secondary condenser (C2), the air supply condenser (C3), and the drain valve (E) is designed as an S-shaped structure, which can naturally discharge condensed dew without causing pressure loss of the drying air. When the present invention is actually used, the condensed water passes through the primary condenser (C1), the secondary condenser (C2), and air supply condenser (C3) are used for cooling, and the condensed water passes through the primary condenser (C1), the secondary condenser (C2), and air supply condenser (C3) in a S-shaped path to increase contact area and have a better temperature exchange efficiency. The humid air is dehumidified through the primary condenser (C1), the secondary condenser (C2), and air supply condenser (C3) to form dry air to be discharged. The dew condensed from the humid air is discharged through the drain valve (E).

The present invention provides a plastic dehumidification and drying device, wherein the primary condenser (C1) and the secondary condenser (C2) are injected with ice water at about 12° C. as refrigerant water for cooling.

Figure 4:
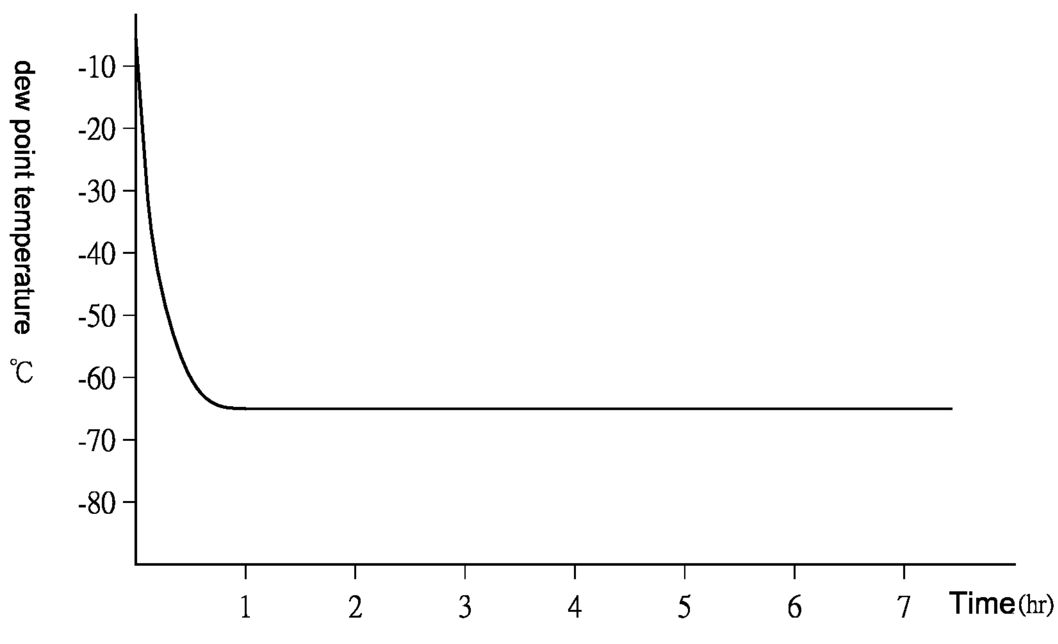
FIG. 4 illustrates a two-dimensional diagram of the dew point temperature and time at the outlet of the low-temperature drying air of the present invention.

FIG. 4 shows the dew point temperature diagram of the dehumidification host system (10). As shown in FIG. 2, there is a low-temperature drying air outlet (A11) at the opening between the host honeycomb runner (A1) and the drying windmills (B5). The measurement of the dew point temperature is carried out at the low-temperature drying air outlet (A11), and the dew point temperature at the low-temperature drying air outlet (A11) drops to −55° C. As shown in FIG. 4, the dehumidification host system (10) is depressurized and air-supplemented through the air supply system (20). The dew point temperature at the low-temperature drying air outlet (A11) can be further lowered to −65° C., which has excellent dehumidification effect. The dehumidification host system (10) starts to operate until the dew point temperature reaches −65° C. in less than 1 hour that has excellent dehumidification efficiency.

The present invention provides a plastic dehumidification and drying device, wherein the plastic fetching device (33) fetches the dry plastic in the plastic drying barrel (31) for the plastic injection molding process.

The present invention provides a plastic dehumidification and drying device, wherein the plastic fetching device (33) fetches the dry plastic in the plastic drying barrel (31) for the plastic extrusion molding process.

The present invention provides a plastic dehumidification and drying device, wherein the plastic fetching device (33) fetches the dry plastic in the plastic drying barrel (31) for the plastic blow molding process.

The practical effect of the present invention is: (1) The present invention cools through the primary condenser (C1) and the secondary condenser (C2), and its instantaneous expansion of the temperature difference accelerates dehumidification of the humid air by dew condensation, and it is discharged through the drain valve (E). The dehumidification host system (10) is depressurized and replenished through the air supply system (20), and the dew point temperature at the low-temperature drying air outlet (A11) can be as low as −65° C. It also proves that the dehumidification host system (10) has better dehumidification efficiency and energy-saving effect. (2) Because the dehumidification host system (10) has better dehumidification efficiency, the dehumidification host system (10) can even be connected with multiple plastic processing systems (30) for dehumidification and drying, avoiding that the plastic processing systems (30) need to be individually erected drying systems, thereby carrying out centralized management of decentralized workshops. The installation cost can be reduced, the quality control is easier, and the operation and management efficiency of the plant are improved. The plastic fetching device (33) fetches the processed and dried plastic in the plastic processing system (30) and makes the quality of the plastic products insured. (3) Compared with the conventional technology, the dehumidification host system (10) of the present invention takes about 9 hours for drying, while the drying time of the conventional system is about 18 hours. The manufacturing target can be reached in ½ time, and the production efficiency is greatly improved. Further, the footprint of the plastic dehumidification and drying device is also reduced by half, which can effectively save the workshop space, and the energy consumption of the dehumidification host system (10) is also reduced to ½. (4) The dehumidification host system (10) has pressure loss in the way of internal circulation, and heating the air will also increase the gas viscosity and increase the pressure loss. If the pressure loss is too large, it will affect the dehumidification host system (10). The gas flow rate affects the dehumidification process of its water vapor saturation condensation. The present invention uses the air supply system (20) to supplement the dehumidification host system (10) with loss of pressure, not only replenishing the pressure of the dehumidification host system (10), the dew point temperature is also reduced, thereby increasing dehumidification efficiency.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A plastic dehumidification and drying device, comprising a dehumidification host system, an air supply system, and at least one plastic processing system, wherein:

the dehumidification host system comprises a host honeycomb runner, a primary condenser, a secondary condenser, a host windmill, a host regeneration windmill, a host regeneration heater, and a host filter;

the air supply system comprises an air supply honeycomb runner, an air supply condenser, an air supply medium pressure windmill, an air supply regeneration windmill, an air supply regeneration heater, and an air supply filter;

the plastic processing system comprises a drying windmill, a heater, a plastic drying barrel, a cyclone dust collector, and a plastic fetching device;

wherein air is cooled by the host windmill through the secondary condenser and enters the host honeycomb runner; a high-temperature regeneration air heated by the host regeneration windmill and the host regeneration heater is sent to the host honeycomb runner to help moisture suction; the high-temperature regeneration air leaves the dehumidification host system through a host regeneration air exit; the host honeycomb runner sends a dehumidified low-temperature dry air to the drying windmill and the dehumidified low-temperature dry air is heated by the heater and sent into the plastic drying barrel; plastics used as raw materials for manufacturing are placed in the plastic drying barrel, and the cyclone dust collector is connected to the plastic drying barrel to suck out the air that becomes high temperature and humid after being used to dry plastics, and returns to the dehumidification host system and passes through the host filter for filtration; the air is then cooled down by the primary condenser and passes through the host windmill to perform a closed cycle; the plastic fetching device is connected to the plastic drying barrel and a dry plastic is fed into the plastic fetching device; since the host windmill of the dehumidification host system in the closed cycle causes pressure loss and system imbalance, it is necessary to use the air supply system to supplement the dehumidification host system to compensate an imbalance caused by pressure loss, therefore, during operation, the air supply system absorbs an atmosphere and passes through the air supply filter to filter, and then cools down through the air supply condenser and discharges dew; cooled air passes through the air supply medium pressure windmill to enter the air supply honeycomb runner to absorb moisture; the air supply honeycomb runner uses the heated high-temperature regeneration air sent by the air supply regeneration windmill and the air supply regeneration heater to help absorb moisture; the regeneration air leaves the air supply system through an air supply regeneration air exit; when the air in the closed cycle reaches the host filter, the host windmill synchronously inhales the low-temperature dry air discharged from the air supply medium-pressure windmill through the air supply honeycomb runner; the primary condenser is also synchronously inhaled the cooled dry air of the host honeycomb runner and the air supply honeycomb runner, so as to supplement the pressure loss of the dehumidification host system; the primary condenser, the secondary condenser, and the air supply condenser are cooled by supplying ice water, and the primary condenser, the secondary condenser, and the air supply condenser are each equipped with a drain valve to discharge condensed dew;

the primary condenser and the secondary condenser are supplied with ice water for cooling, instantly expand a temperature difference to accelerate a dew condensation effect, and then shrink the moisture of a humid air to achieve an effect of dehumidification and drying; the dehumidification host system is compensated the pressure loss through the air supply system to further improve the dew condensation effect, so that the dehumidification host system has a lower dew point temperature and shrinks the moisture of the humid air to achieve better dehumidification efficiency.

2. The plastic dehumidification and drying device of claim 1, wherein a connection between the primary condenser, the secondary condenser, the air supply condenser, and the drain valve is an S-shaped structure.

3. The plastic dehumidification and drying device of claim 1, wherein the primary condenser and the secondary condenser are injected with ice water at about 12° C. as refrigerant water.

4. The plastic dehumidification and drying device of claim 1, wherein the plastic fetching device fetches the dry plastic in the plastic drying barrel.

* * * * *